United States Patent [19]
Krauss et al.

[11] Patent Number: 5,099,573
[45] Date of Patent: Mar. 31, 1992

[54] METHOD OF MAKING HOLLOW ARTICLES

[75] Inventors: Tony M. Krauss, Bay Village; Craig R. Boyer, N. Olmsted; Donald J. Moracz, Garfield Heights, all of Ohio

[73] Assignee: Compressor Components Textron Inc., Cleveland, Ohio

[21] Appl. No.: 544,415

[22] Filed: Jun. 27, 1990

[51] Int. Cl.$^5$ .............................................. B23K 31/00
[52] U.S. Cl. .................................... 29/889.2; 29/421.1; 29/463; 29/889.7; 228/157; 228/227; 228/234; 228/236; 228/243; 416/233
[58] Field of Search .......... 29/889.7, 889.72, 889.721, 29/889.722, 421.1, 463; 228/193, 195, 194, 227, 234, 236–240, 242, 243, 157; 416/232, 233

[56] References Cited

U.S. PATENT DOCUMENTS

| | | | |
|---|---|---|---|
| 2,807,437 | 9/1957 | Rousch | 253/77 |
| 3,628,226 | 12/1971 | Nelson | 29/156.8 H |
| 3,736,638 | 6/1973 | Stone, Jr. | 29/156.8 |
| 3,787,959 | 1/1974 | Moore et al. | 29/482 |
| 4,087,037 | 5/1978 | Schier et al. | 228/106 |
| 4,089,456 | 5/1978 | Toppen et al. | 228/195 |
| 4,181,000 | 1/1980 | Hamilton et al. | 72/60 |
| 4,220,276 | 8/1980 | Weisert et al. | 228/118 |
| 4,233,829 | 11/1980 | Hamilton et al. | 72/38 |
| 4,233,831 | 11/1980 | Hamilton et al. | 72/60 |
| 4,294,419 | 10/1981 | Fouse et al. | 244/177 |
| 4,304,821 | 12/1981 | Hayase et al. | 428/593 |
| 4,331,284 | 5/1982 | Schulz et al. | 228/157 |
| 4,354,369 | 10/1982 | Hamilton | 72/38 |
| 4,603,808 | 8/1986 | Stacher | 228/265 |
| 4,606,778 | 8/1986 | Jahnke | 148/11.5 N |
| 4,611,752 | 9/1986 | Jahnke | 228/194 |
| 4,642,863 | 2/1987 | Schulz | 29/156.8 B |

*Primary Examiner*—Irene Cuda
*Attorney, Agent, or Firm*—Reising, Ethington, Barnard, Perry & Milton

[57] ABSTRACT

A method of making a hollow article, for example, a hollow airfoil, from first and second preformed sections involves a first precursor (seal) bonding step where a low external pressure and internal vacuum are utilized to form a substantially gas impermeable seal bond between opposing bonding surfaces of the sections with only limited distortion of one of the sections and no distortion of the other section, a diffusion bonding step where a high external and high internal pressure is utilized to form a complete parent metal diffusion bond between the bonding surfaces without distortion of either section and an inflation step where a high external and high internal pressure are utilized to remove the limited distortion from the affected section without distortion of the unaffected section. The inflation step and diffusion bonding step can be combined into one operation to provide a two step method of making the hollow article.

19 Claims, 6 Drawing Sheets

METHOD OF MAKING HOLLOW ARTICLES

FIELD OF THE INVENTION

The present invention relates to a method of making a hollow article and, in particular, to a method of making a hollow airfoil, by diffusion bonding separate preformed sections, such as blade halves.

BACKGROUND OF THE INVENTION

The Schulz U.S. Pat. No. 4,642,863 describes a process for making a hollow article, especially a hollow airfoil, from multiple sections by superplastic forming and diffusion bonding (SPF/DB). In particular, the method employs an internal mandrel having a non-reactive surface by virtue of being coated with a release agent, such a yttria or boron nitride. One or more mandrels are sandwiched between the metallic sheets to allow contact therebetween at only desired locations; for example, at the leading edge, trailing edge and an intermediate rib to be formed between the sheets intermediate the leading and trailing edge. The mandrels provide control of the internal radius of the leading and trailing edges. The assembly of the metallic sheets and mandrels is maintained under coordinated temperature-gas pressure-time conditions to diffusion bond the sheets together at those locations in contact by virtue of the configuration of the mandrel. After diffusion bonding, an inert gas is injected between the sections while the bonded assembly is held in a die set of desired configuration and heated to a superplastic forming temperature. The gas pressure is controlled to superplastically inflate the bonded assembly to conform to the die shape.

It is an object of the invention to provide a method of making a hollow article, such as a hollow airfoil, where sequential low and high pressure diffusion bonding conditions are selected in conjunction with alternate external die support of the sections to avoid distortion of one section altogether while controllably limiting distortion of the other section.

It is another object of the invention to provide a method of making a hollow article, such as a hollow airfoil, from preformed sections where a fluid pressure inflation step is conducted subsequent to or preferably concurrently with high pressure diffusion bonding to remove any minor distortion of the distorted section.

It is another object of the invention to provide a method of making a hollow article, such as a hollow airfoil, where there is no need for superplastic forming of the sections to impart a desired configuration thereto or for internal mandrels between the sections.

SUMMARY OF THE INVENTION

The present invention contemplates a method of making a hollow article from first and second metallic preformed sections wherein the first and second sections are assembled in such a manner that bonding surfaces thereon are opposing and a cavity is formed between intermediate walls of the sections. The assembled sections are subjected to coordinated pressure-temperature-time conditions where a first external pressure is so applied to the first section with the cavity evacuated as to form a substantially fluid impermeable precursor or seal diffusion bond between the bonding surfaces. During this step, the intermediate wall undergoes some inward distortion as a result of the negative pressure differential established thereacross. Inward distortion is limited to an amount which can be removed by subsequent inflation of the intermediate wall. Preferably, the extent of such inward distortion is controlled or limited by applying a relatively low external pressure on the first section (preferably not exceeding approximately 100 psi although the actual maximum pressure is dictated by the design of the hollow article and material to be bonded; e.g., pressures of 300 psi have been used).

Distortion of the intermediate wall of the second section is prevented by subjecting both the cavity and the exterior of the second section to a relative vacuum while supporting the second section on a rigid die or shaping surface.

In one embodiment of the invention, the first and second sections are then subjected to coordinated pressure-temperature-time conditions where an external pressure of greater magnitude (usually greater than 300 psi) than that applied to effect the seal bond is applied to the second section and an internal fluid pressure of substantially the same magnitude as the second external pressure is applied to the cavity while the intermediate wall of the first section is cooperatively positioned relative to a rigid external shaping surface. The internal pressure in the cavity causes the intermediate wall of the first section to conform outwardly to the shaping surface to remove any minor inward distortion resulting from the previous precursor or seal bonding step. The external pressure on the second section, in turn, effects complete diffusion bonding between the bonding surfaces and prevents distortion of the intermediate wall of the second section. This embodiment of the invention combines the diffusion bonding step and inflation step into one operation.

In another embodiment of the invention where the diffusion bonding step and inflation step are practiced separately, the first and second seal bonded sections are subjected to coordinated pressure-temperature-time conditions where the aforementioned greater second external pressure is so applied to the first section and an internal pressure of substantially the same magnitude is so applied to the cavity as to diffusion bond the bonding surfaces without further inward distortion of the intermediate wall of the first section. During this high pressure diffusion bonding step, distortion of the intermediate wall of the second section is prevented by supporting it on a rigid die or shaping surface. After diffusion bonding, the sections are then subjected to coordinated pressure-temperature-time conditions where a high internal pressure is applied to the cavity with the intermediate wall of the first section cooperatively positioned relative to another rigid die or shaping surface. The internal pressure is applied at a level to shape the intermediate wall of the first section to the rigid shaping surface. Distortion of the intermediate wall of the second section is prevented by applying external pressure thereon of substantially the same magnitude as the internal pressure applied in the cavity between the sections.

The method of the present invention is especially useful, although not limited to, forming a hollow airfoil, such as a hollow gas turbine engine fan blade, from preformed airfoil halves which may be forged, cast, machined or otherwise formed. The method of the invention is capable of making hollow airfoils to strict tolerances required since distortion of one airfoil half is prevented altogether while distortion of the other half is controlled or limited in the seal bonding step and diffusion bonding step and is subsequently removed by inflation against a precision rigid die surface.

These and other objects and advantages of the present invention will become more readily apparent from the detailed description and drawings which follow.

DETAILED DESCRIPTION OF THE INVENTION

The present invention is illustrated in detail hereinbelow with respect to the fabrication of a hollow gas turbine engine fan blade constituting one of the preferred embodiments of the invention. However, illustration of the invention in this manner is not to be construed as limiting the scope and applicability of the present invention which has wider applicability to other products. For example, the invention is also applicable to and useful for the manufacture of other gas turbine engine parts and airframe parts, high performance static and dynamic engineering structures, and surface and underwater marine devices and ordnance.

In accordance with the present invention, the desired hollow article is to be formed from two or more preformed metallic sections, bondable together at a parting or bonding plane, such that the internal features forming the hollow portion of the article are initially exposed for inspection and repair/reconfiguring, if necessary, prior to bonding. In particular, in the case of a hollow gas turbine engine fan blade, the blade is formed from first and second preformed blade half sections 10,12, FIG. 1, bondable at a parting or bonding planes "P" therebetween oriented along the precise or approximate mean camber surface, which is a blade datum reference plane well known in the art. The precise location of the parting or bonding planes will be dependent upon the internal cavity designs(s), service stress field distributions, and/or convenience for the preform fabrication operation.

Figure 1:
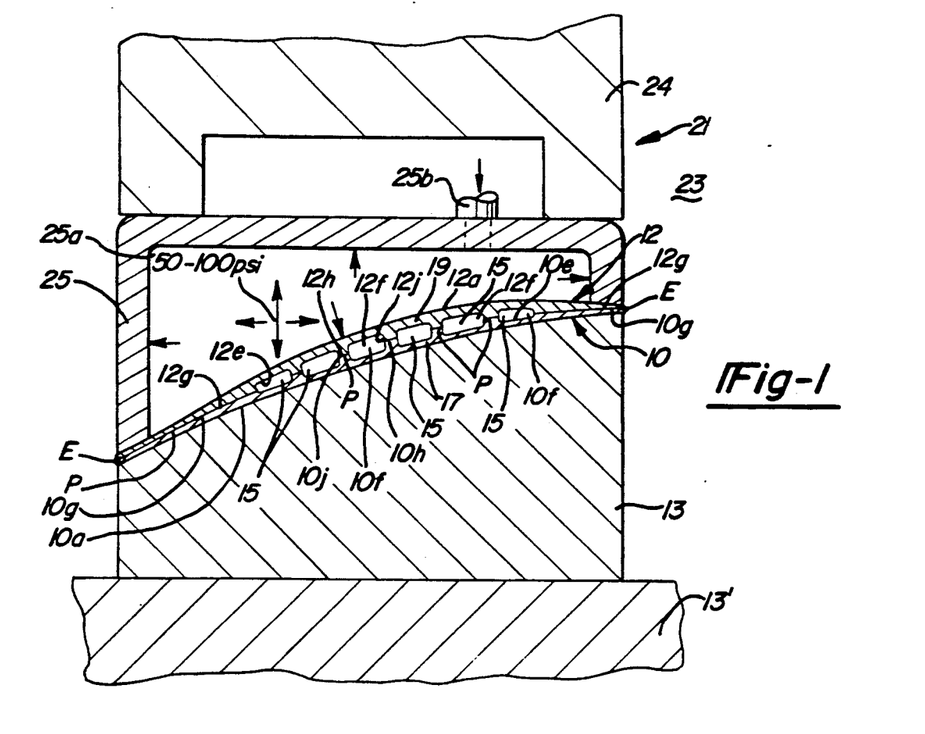
FIG. 1 is a cross-sectional view of concave and convex airfoil sections positioned on a die of a vacuum press for practicing the invention.
Figure 9:
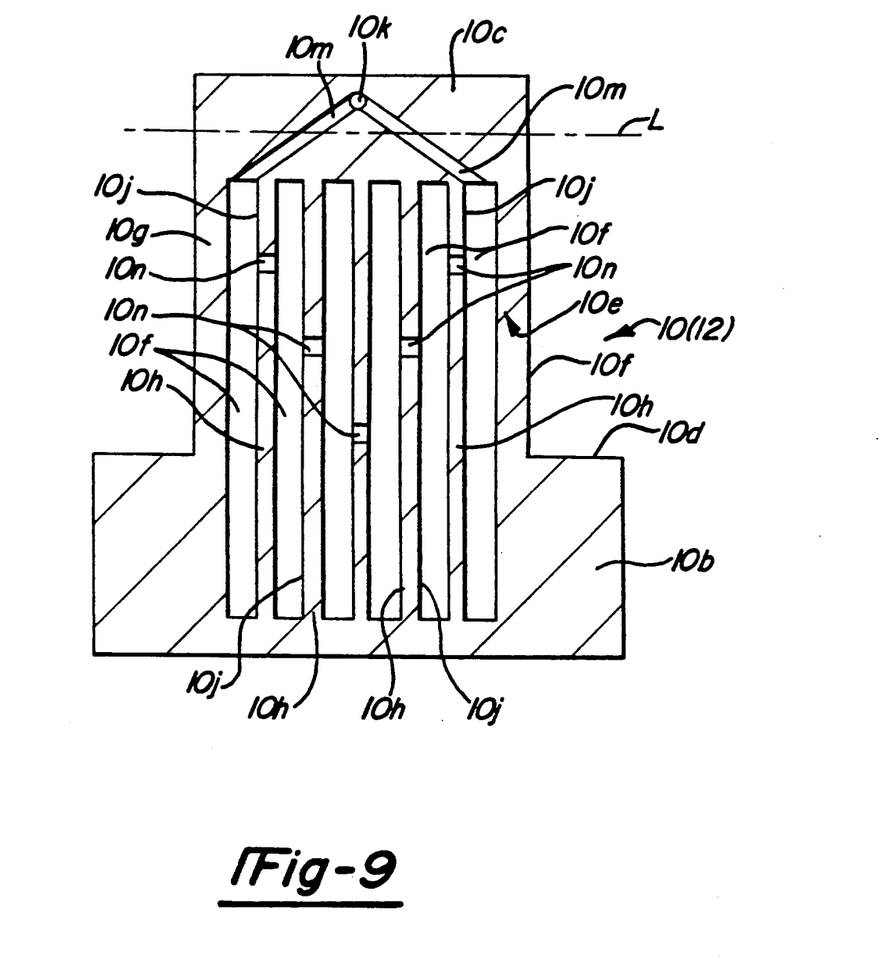
FIG. 9 is an elevational view of the inner side of one of the airfoil sections showing the gas passages formed therein for delivering gas pressure to the cavities of the airfoil. The inner side of the other airfoil section is generally the same in configuration.

Referring to FIG. 1, each preformed blade section 10,12 is illustrated as including a first, outer, partial airfoil-shaped side 10a (concave side),12a (convex side) and a second inner side 10e,12e, respectively. The sides 10a,12a; 10e,12e are disposed between root-shaped portions (only root portion 10b shown for blade section 10, FIG. 9) and tip portions (only tip portion 10c shown for blade 10, FIG. 9) of each blade. Each root-shaped portion may include an optional laterally extending partial platform portion (only platform portion 10d shown, FIG. 9) depending upon the particular blade design to be manufactured.

The second, inner sides 10e,12e each include a plurality of longitudinally extending (i.e., extending from the root-shaped portion toward the respective tip) cavities 10f,12f separated and bounded by spaced apart peripheral bonding surfaces 10g,12g and inboard bonding surfaces 10h,12h disposed on raised support ribs 10j,12j in the desired bonding plane. As mentioned hereinabove, the bonding surfaces 10g,12g and 10h,12h may be oriented substantially on the mean chamber surface of the blade to be formed.

In FIG. 1, the first and second blade sections 10,12 are shown assembled and positioned on a first rigid die 13 with the peripheral bonding surfaces 10g,12g abutting and with cavities 15 formed by cooperating cavities 10f,12f between intermediate walls 17,19. Rigid die 13 is supported on rigid support member 13'. Intermediate walls 17,19 extend between the peripheral bonding surfaces 10g,12g. The support ribs 10j,12j and respective intermediate walls 17,19 are integrally formed. The inboard bonding surfaces 10h of the blade section 10 are in abutting relation to inboard bonding surfaces 12h on blade section 12.

The inner sides 10e,12e of each blade section 10,12 are directly accessible prior to assembly for observation and inspection of the cavities 10f,12f and bonding surfaces 10g,12g; 10h,12h for dimensional accuracy, structural integrity, metallurgical quality, etc.

The blade sections 10,12 are produced from suitable metals/alloys by appropriate precision fabrication operations. These operations can include, but are not limited to, forging and forming, machining, net P/M (powder metallurgy) techniques, or others. The precision forging process is the preferred method for titanium alloys used in hollow aircraft engine fan blades and will be incorporated hereafter in the example of the invention. Although simple rectangular cavities 10f,12f are illustrated in the drawings, other cavity designs can be similarly provided. Virtually any internal cavity geometry can be accommodated by the method of the invention and the cavity shape shown is not to be construed as being the sole embodiment of the method of the invention or the only cavity design option available.

The resultant blade sections 10,12 can be easily inspected to accurately verify the geometry of the internal cavities 10f,12f at this point of the manufacturing sequence. The post-forge inspections are performed following removal of forge process aids, such as lubricants, coatings, and possible reaction zones.

In the event of the presence of geometric or metallurgical imperfections or defects on the bondable blade sections 10,12, especially on the inner sides 10e,12e, corrective action can be taken prior to joining the blade halves 10,12 together. Such corrective action can include rework, cavity refinement, and feedback to the forge process to minimize or eliminate future deviations. Also, the critical cavity geometry verification operation can be performed prior to accumulation of significant added value to the product. This is a major advantage over existing art in which the cavity 10f,12f can only be examined after most of the value has been added to the product.

It is further noted that attachment details; e.g., the root-shaped portions (root portion 10b and tip portion 10c in FIG. 9) of the blade sections 10,12 or other external details, are forged integrally to the blade halves 10,12. This eliminates the need to separately attach such details to the blade halves 10,12 and thus concerns over the integrity of joints where the details would be attached. The process provides for incorporating the attachment details integral with the preforms, eliminating the cost and/or concerns for attaching separate attachment details, common for many existing prior art methods. Further, the attachment details are provided in a near-net form for either straight or arcuate root forms or to provide a controlled mass for subsequent bonding of the airfoil to a hub structure.

Once the geometry of internal cavities 10f,12f has been fully developed by a precision machining operation and also verified by direct inspection prior to assembly, no further permanent major metal flow of deformation is required by the succeeding steps of the method of the invention. As will become apparent, the succeeding steps assure that the geometry of the internal cavities 10f,12f can be maintained throughout the remainder of the fabrication sequence.

The dimensionally inspected, qualified and assembled blade preform sections 10,12 are now subjected to coordinated pressure-temperature-time conditions to develop a substantially gas impermeable precursor or seal diffusion bond between the bonding surfaces 10g,12g and 10h,12h. This precursor or seal bond is referred to as a "sticker" bond and may be characterized by discontinuous porosity between the bonding surfaces (e.g., see FIGS. 10A and 10B where elongated porosity is shown at the seal bond). In any event, the seal bond is not a complete parent metal diffusion bond as is desired in the final manufactured hollow blade but rather has mechanical properties that are inadequate for the actual service conditions that the blade is to encounter. As will become apparent, the gas seal bonds function to resist or prevent gas pressure penetration between the bonding surfaces 10g,12g and 10h,12h during the subsequent high pressure diffusion bonding step to be described and, if any porosity is present in the seal bonds, to preserve a relative vacuum therein during such high pressure diffusion bonding.

The process sequence of the invention prior to precursor or gas seal bonding involves first assembling the blade sections 10,12 (as shown in FIG. 1) and then joining the blade sections 10,12 around the peripheral edges E in a vacuum environment. The objective is to bring the bonding surfaces 10g, 12g; 10h,12h into reasonable approximation of opposing or abutting relation prior to positioning on the die 13. Allowance for the joining operation is provided around the periphery of the blade halves 10,12 such that the region containing the sealing joint or edge E is outside the finished blade envelope and cannot compromise the physical or mechanical condition thereof.

The edge joining of the blade sections 10,12 can be accomplished by a variety of means, the preferred practice being electron beam welding in a vacuum (e.g., $10^{-5}$ mm of Hg). Other known joining techniques can be used. Another objective of edge joining is to provide a relative vacuum (e.g., $10^{-5}$ mm of Hg) in the cavities 15 formed between the intermediate walls 17,19 to facilitate bonding of the bonding surfaces 10g,12g and 10h,12h. This edge joining operation provides a sealed, vacuum environment in the cavities 15 between the inner sides 10e,12e.

Figure 2:
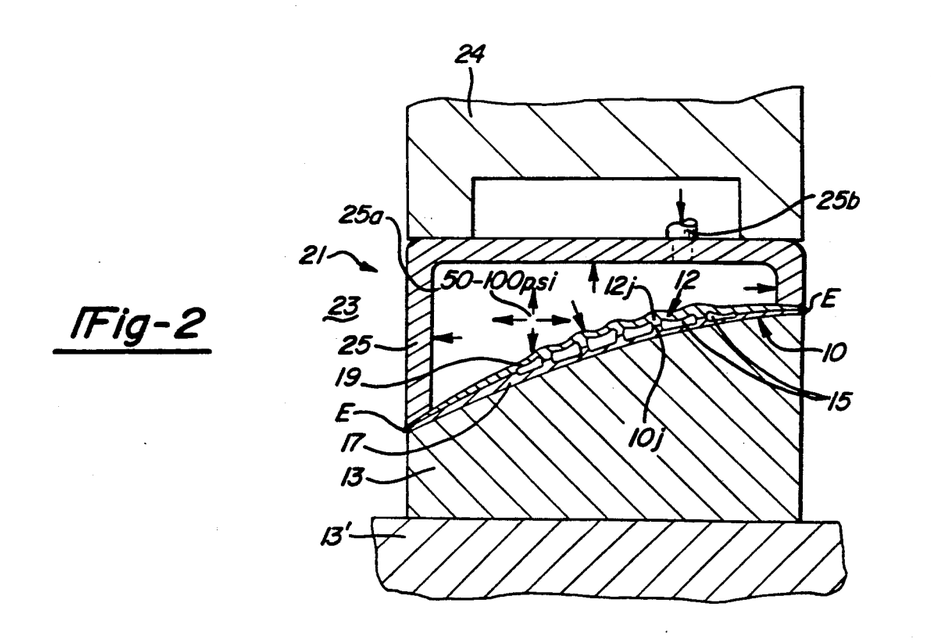
FIG. 2 is similar to FIG. 1 after the bonding surfaces of the airfoil sections are precursor (seal) bonded by the low pressure step of the method of the invention.

Precursor or seal bonding is accomplished by the application of heat and pressure over time to the assembled blade sections 10,12 (with the cavities 15 evacuated as a result of the edge sealing operation described above) in a vacuum press 21 shown schematically in FIGS. 1 and 2. In this embodiment, the vacuum press comprises a vacuum chamber 23 of a furnace (not shown), a heat resistant press member 24 and a gas pressure (fluid pressure) manifold 25 to apply fluid pressure to the outer airfoil-shaped side 12a while the outer, airfoil-shaped side 10a is supported by the complementarily-shaped, rigid, heat resistant die 13 in the vacuum chamber 23 of the furnace. As mentioned above, the rigid die 13 is itself supported on rigid support 13'. The press member 24 sealingly engages manifold 25 to the side 12a adjacent the edges E. The manifold 25 includes a chamber 25a which is gas (argon) pressurized from an external source (not shown) through one or more inlets 25b (one shown) to apply bonding pressure to the blade sections 10,12.

In developing the initial seal bond between bonding surfaces 10g,12g; 10h,12h, a relatively low external fluid (gas) pressure (see arrows) is applied in chamber 25a and on wall 19 in coordination with elevated temperature and time at temperature so as to limit inward collapse or distortion of the intermediate wall 19 into the cavities 15 which, as mentioned, are evacuated; i.e., maintained under a relative vacuum (e.g., $10^{-5}$ mm of Hg as a result of the edge sealing operation described hereinabove). In particular, inward distortion is preferably restricted to a minor amount that is removable by a subsequent inflation step. If the design of the airfoil permits, the inward distortion of wall 19 is limited so as to prevent any contact between the intermediate wall 19 and the intermediate wall 17, thereby eliminating any need for a stop-off or release agent in the cavities 10f,12f. When the design of the airfoil makes elimination of contact between the intermediate walls 17,19 impossible, a stop-off or release agent is used on one or both of the walls 17,19 and remains in the final bonded hollow airfoil. Inward distortion of the intermediate wall 17 of the blade section 10 is substantially prevented by subjecting the exterior of wall 17 and the die 13 to the relative vacuum (e.g., $10^{-4}$ mm of Hg) maintained in the vacuum chamber 23. In effect, there is insufficient differential pressure between the cavities 15 and the exterior of intermediate wall 17 to cause distortion of wall 17 under these bonding conditions. Outward distortion of the blade section 10 from the external gas pressure on the blade section 12 is prevented by the support provided by die 13. The gas seal bonded sections 10,12 are shown in FIG. 2.

Figure 10A:
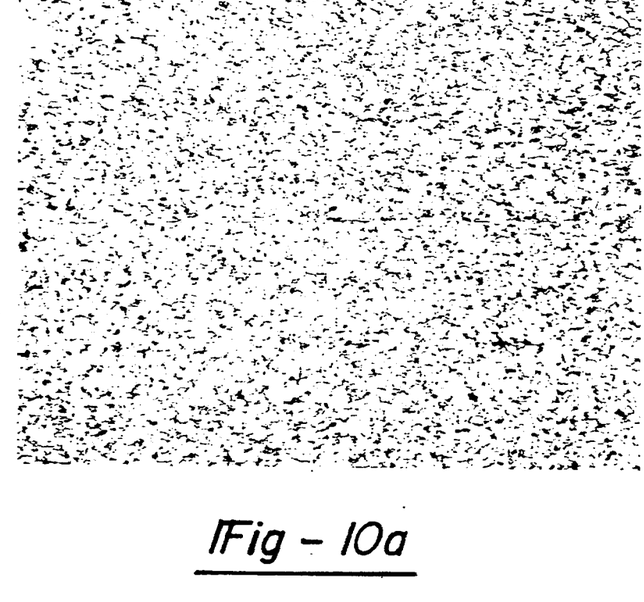
FIGS. 10a and 10b are photomicrographs at 100× and 500×, respectively, of a typical gas seal bond resulting from the low pressure gas seal bond step of the invention.
Figure 10B:
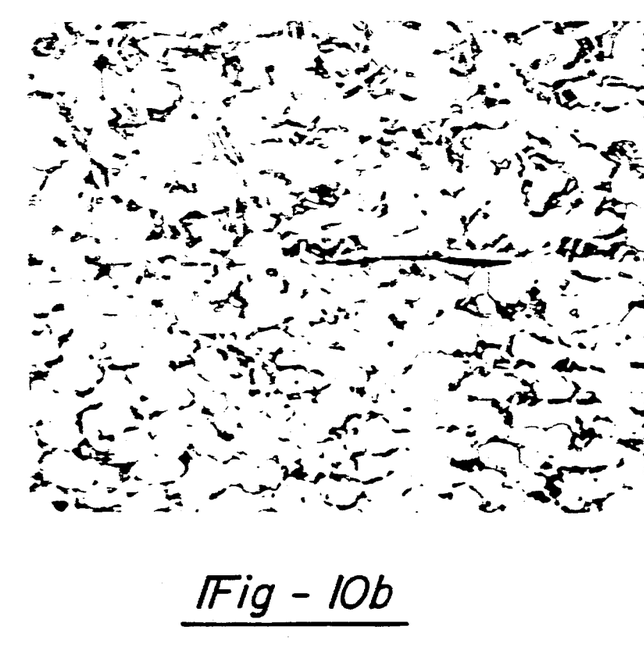

For purposes of illustration only, when the blade sections 10,12 are made of the well known Ti-8Al-1Mo-1V alloy, a gas (argon) pressure in the manifold chamber 25a of about 50-100 psi is employed with a temperature of about 1700° F. of the sections 10,12 for a time of 120 minutes to develop the desired gas seal bonds at bonding surfaces 10g,12g; 10h,12h. FIGS. 10a and b illustrate a typical gas precursor or seal diffusion bond formed between Ti-8Al-1Mo-1V blade sections 10,12. Other combinations of pressure, temperature and time can be used within the scope of the invention depending upon the material from which the sections 10,12 are made, their geometry (e.g., thickness and cavity design) and other parameters.

Advantageous features of the gas seal bonding are that distortion of blade section 10 is prevented altogether, that the external pressure in manifold chamber 25a is controllably limited to control inward flow and/or distortion of the intermediate wall 19 of the precision blade section 12 and that, when the airfoil design permits, no stop-off or release agent is required between the sections 10,12.

Following precursor or seal bonding of the bonding surfaces 10g,12g; 10h,12h, these bonding surfaces are parent metal diffusion bonded in the evacuated chamber 23 of the vacuum press using high manifold fluid pressure to form a complete, non-porous diffusion bond with parent metal properties adequate for the intended service conditions to be encountered. In particular, referring to FIG. 3, to effect such diffusion bonding, the manifold chamber 25a is gas pressurized (argon gas) through inlet 25b from an external source (not shown) to a level (e.g., above about 300 psi) generally several times greater than the relatively low gas pressure (e.g., 50-100 psi) used during seal bonding. This provides a high external fluid (gas) pressure on intermediate wall 19. Moreover, the cavities 15 are internally gas pressurized (argon gas) to substantially the same level as provided in manifold chamber 25a. Gas pressure is supplied to the cavities 15 through an inlet hole 10k to a gas inlet passages 10m and then to the cavities 15 which are interconnected in gas flow relation via gas openings 10n in the support ribs 10j,12j, FIG. 9. In this way, pressurized gas can be supplied to each cavity 15 from an external source (not shown). The inlet hole 10k is located on a portion of the blade section 10 that would eventually be cut off (see cut line L) or otherwise removed from the finished bonded blade.

Figures 3, 4, 5:
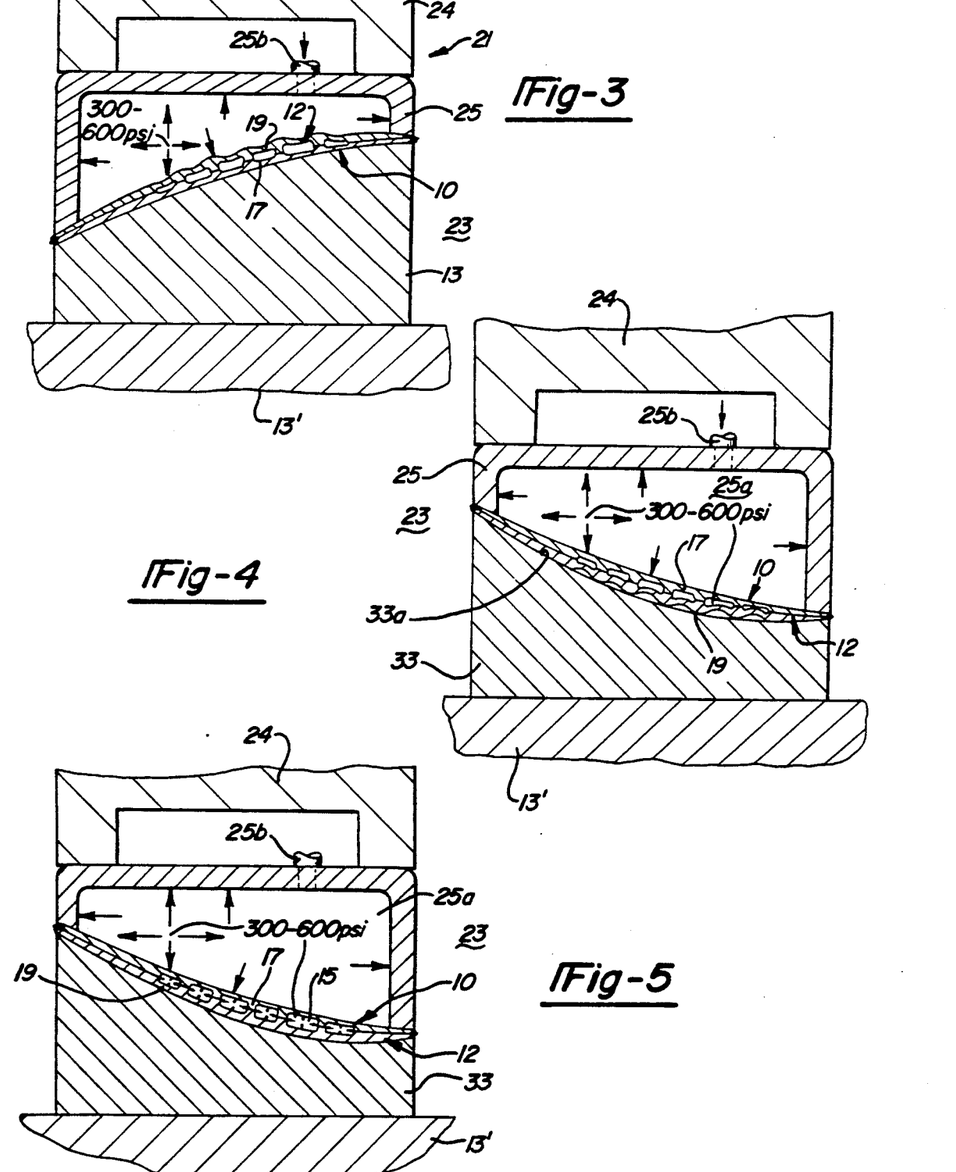
FIG. 3 is similar to FIG. 2 illustrating the diffusion bonding of the bonding surfaces of the airfoil sections by the high pressure diffusion bonding step of the method of the invention.
FIG. 4 is similar to FIG. 1 with the diffusion bonded hollow airfoil inverted on a second die of the vacuum press in preparation for inflation of the distorted airfoil wall.
FIG. 5 is similar to FIG. 4 after the inflation step of the method to conform the distorted airfoil to the second die and restore the desired precision contour thereto.

Since the gas pressure in the cavities 15 is equal to the external gas pressure on intermediate wall 19, further inward distortion of that wall 19 is prevented even though a much higher gas pressure is present in the manifold chamber 25a than during the previous gas seal bonding step. Outward distortion of wall 17 is prevented by support of die 13.

Figure 11A:
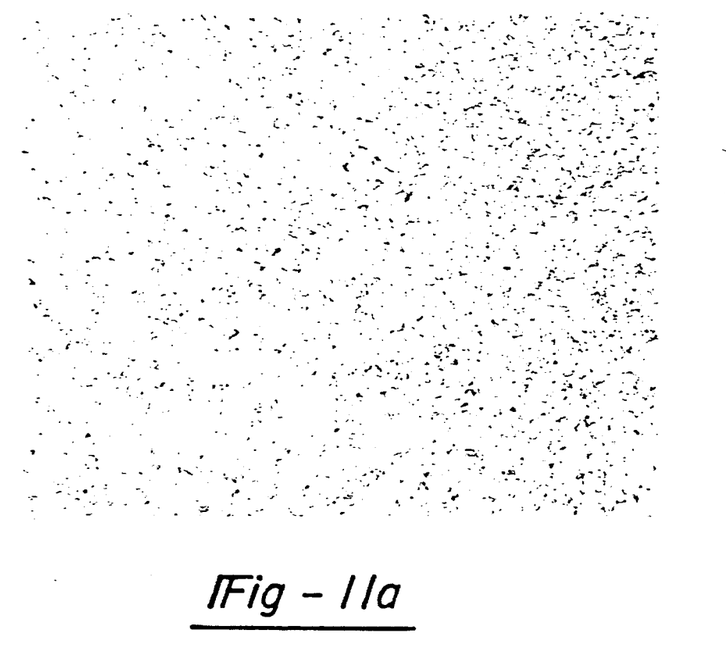
FIGS. 11a and 11b are photomicrographs at 100× and 500×, respectively, of a typical parent metal diffusion bond resulting from the high pressure diffusion bonding step of the invention.
Figure 11B:
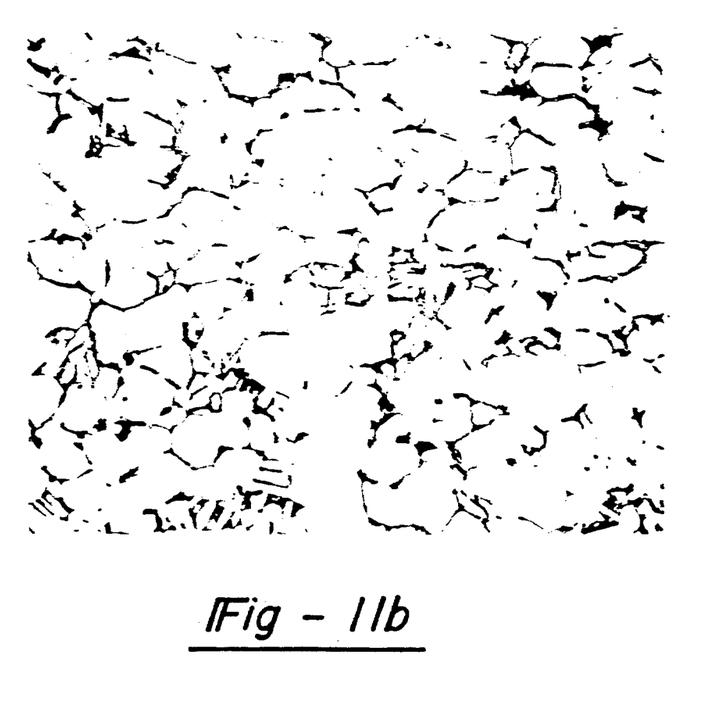

The temperature, pressure and cycle time of the diffusion bonding step are dependent upon the specific alloy comprising the blade sections 10,12. In the case mentioned above where the blade sections 10,12 are made of Ti-8Al-1Mo-1V alloy, the temperature would be about 1750° F. at an external and internal gas pressure of 300 psi-600 psi for about 120 minutes. FIGS. 11a and b illustrate a parent metal diffusion bond formed for Ti-8Al-1Mo-1V blade sections 10,12. Other combinations of these parameters would be utilized depending on mechanical and metallurgical requirements of the alloys and service applications involved. In general, the gas pressure for this diffusion bonding is selected as high as possible without causing significant upset of the support ribs 10h,12h. Some upset of the ribs 10h,12h can be tolerated and can be accommodated for in the original design of the cavities to provide desired cavity geometry.

Following complete (parent metal) diffusion bonding of the bonding surfaces 10g,12g and 10h,12h during the diffusion bonding cycle, the inward distortion of the intermediate wall 19 is removed by an inflation step. This (the inflation step) is accomplished in a vacuum press by applying internal fluid (argon gas) pressure to the cavities 15 while the diffusion bonded sections 10,12 are positioned on a heat resistant die 33, FIGS. 4 and 5.

In particular, the distorted intermediate wall 19 of the blade section 12 is cooperatively positioned on the heat resistant die 33 having a surface 33a configured identically to that desired on the finished blade (corresponding to the original precision outer configuration of the intermediate wall 19). The exterior of the distorted intermediate wall 19 is typically exposed to the relative vacuum (e.g., $10^{-4}$ mm of Hg) in the vacuum chamber 23 surrounding the die 33 although the invention is not so limited so long as an adequate positive differential pressure exists across wall 19 to shape it to the die surface. Typically, the blade sections 10,12 are allowed to cool to ambient temperature after diffusion bonding step and then reheated and positioned on the die 33 as shown in FIGS. 4-5.

During the inflation step, the manifold chamber 25a and cavities 15 are gas pressurized to substantially the same level or magnitude as used in the diffusion bonding step (e.g., 300 psi-600 psi for Ti-8Al-1Mo-1V blade sections 10,12) and subjected to the same or similar temperature and time parameters employed during diffusion bonding. As a result of the high gas (argon) pressure in the cavities 15, and the relative vacuum on the exterior of the distorted intermediate wall 19, the intermediate wall 19 is forced and shaped outwardly against the external shaping surface 33a of die 33 to conform to it and remove the inward distortion from the gas seal bonding step and restore the intermediate wall 19 to its original precision contour, FIG. 5. The high gas pressure in the manifold chamber 25 counterbalances that in the cavities 15 to prevent distortion of the intermediate wall 17 of blade section 10.

Removal of the diffusion bonded blade sections 10,12 from the vacuum press 21 after restoration of intermediate wall 19 completes this embodiment of the method of the invention. Cleaning, trimming and final finishing of the external surfaces of diffusion bonded blade sections 10,12 would follow practices well established by those skilled in the art of airfoil manufacture.

Although the seal bonding, parent metal diffusion bonding and inflation steps are described hereinabove as being practiced when the vacuum chamber 23 is evacuated (e.g., $10^{-4}$ mm of Hg), it is within the scope of the invention to provide ambient (air), inert or other atmospheres in the chamber 23 during conduct of one or more of these operations. Moreover, these operations may be carried out using a series of presses 21, each press being used to perform one of the operations in succession on the sections 10,12. The sections 10,12 may be preheated prior to positioning in each press.

Specific advantages of the diffusion bonding and inflating steps method of the invention are as follows:

(a) Diffusion bonding pressures are always normal to the bonding surfaces 10g,12g and 10h,12h.
(b) The diffusion bonding process is not limited by die or preform geometries or tolerances, or the lack thereof.
(c) Any preform geometry, such as large fan blades or other complex design structures can be accommodated.
(d) The precision of the blade section 10 is not compromised by any significant metal deformation during the gas seal bonding, diffusion bonding or inflation steps.
(e) A high diffusion bonding pressure during the diffusion bonding step after the gas seal bonding step can be used without further distorting the intermediate wall 19 of the blade section 12.
(f) The inflation operation (pressurizing cavities 15) restores the precise external contour of the intermediate wall 19 of the blade section 12.
(g) No superplastic behavior is required for any of the features of the blade sections 10,12, thus allowing virtually any alloy having adequate workability to be used.
(h) Initial properties of the materials comprising the blade sections 10,12 are preserved, i.e., mechanical properties are not degraded or reduced.
(i) Post-diffusion bond verification of the resultant bond integrity is easily facilitated as the bond plane is readily accessible and easily defined.
(j) The final desired blade geometry is assured.
(k) The use of internal stop-off materials or release agents between the blade sections 10,12 may be eliminated as permitted by the particular airfoil design involved.

Figures 6, 7, 8:
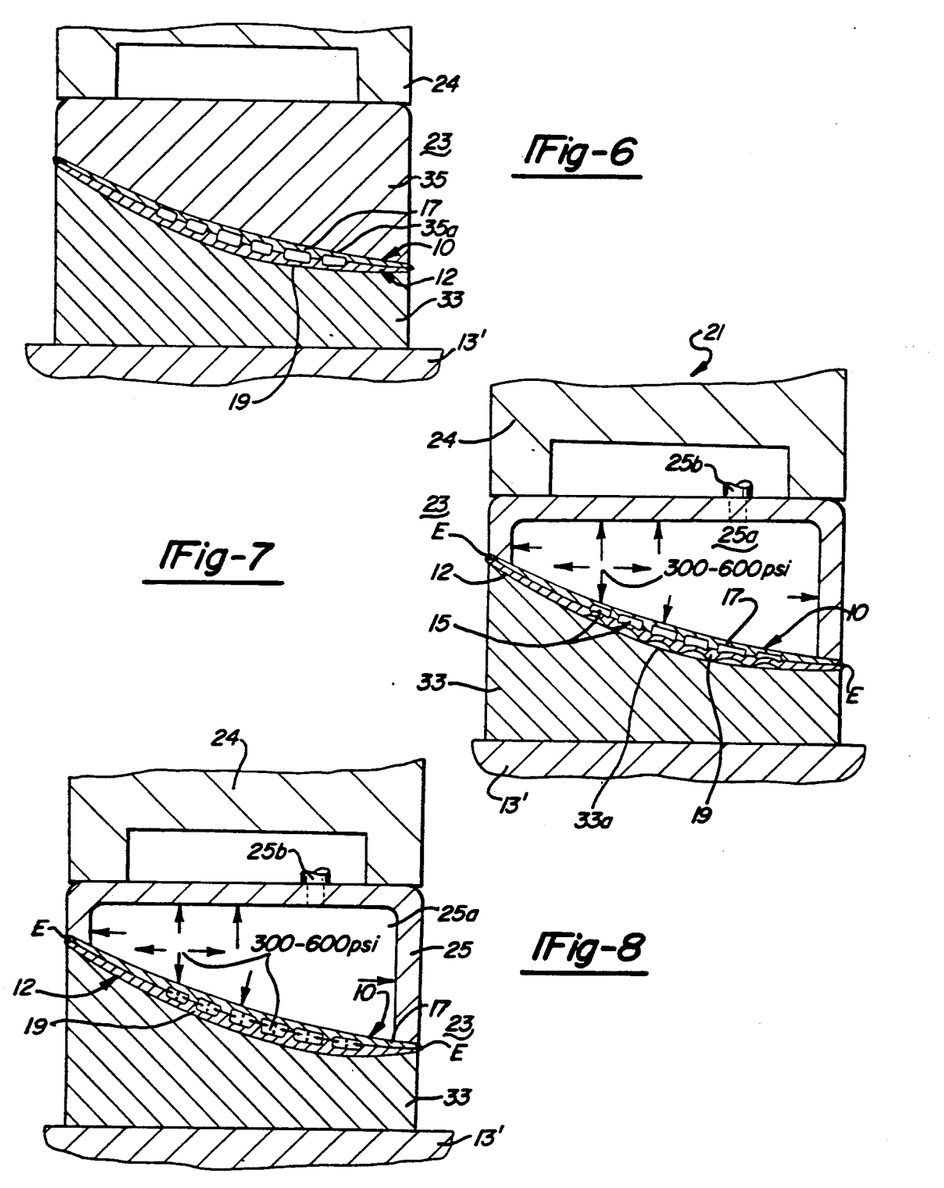
FIG. 6 is a cross-sectional view of another embodiment of the invention where a rigid die is substituted in the vacuum press for the manifold of FIG. 1.
FIG. 7 is a cross-sectional view of the hollow airfoil, after gas seal bonding, and in accordance with another embodiment of the invention where the seal bonded airfoil is supported on a rigid die of a vacuum press so as to practice the high pressure diffusion bonding step and inflation step in one operation.
FIG. 8 is similar to FIG. 7 after the high pressure diffusion bonding and inflation operation.

A variation of the inflation step described hereinabove is illustrated in FIG. 6 where a heat resistant die 35 is substituted for the manifold 25. The complementary contoured surface 35a of the die 35 is pressed via press member 24 against the intermediate wall 17 to counter the internal pressure in cavities 15, thereby preventing distortion of the intermediate wall 17 during the inflation operation to restore the precision contour to intermediate wall 19.

A second embodiment of the invention is illustrated by reference to FIGS. 1-2 and FIGS. 7-8 where like reference numerals are used to designate like features of FIGS. 1-2. In accordance with this embodiment, the blade sections 10,12 are assembled and the bonding surfaces 10g,12g and 10h,12h are precursor or "sticker" bonded in the manner described hereinabove for the preceding embodiment and shown in FIGS. 1-2.

However, after the bonding surfaces 10g,12g and 10h,12h are gas seal bonded, the blade sections 10,12 are placed on the rigid die 33 in the vacuum chamber 23 with the distorted intermediate wall 19 of the blade section 12 adjacent the rigid, heat resistant die 33, FIG. 7. The manifold 25 is sealingly engaged to the blade section 10 (outer periphery thereof) by press member 24. The exterior of the intermediate wall 19 is subjected to the relative vacuum (e.g., $10^{-4}$ mm of Hg) in the vacuum chamber 23 surrounding the die 33. Concurrently, high fluid pressure (argon gas) is applied to the cavities 15 and to the manifold chamber 25a such that the pressure in the cavities 15 is substantially equal to that in the manifold chamber 25a. This pressure is coordinated with the elevated temperature and time at temperature and pressure to conform the intermediate wall 19 to the shaping surface 33a of the die to remove the distortion (i.e., to restore the intermediate wall 19 to its original precision contour) and also to effect a complete parent metal diffusion bond between the bonding surfaces 10g,12g and 10h,12h. FIG. 8 illustrates the blade sections 10,12 after the combined diffusion bonding and inflation operation.

In this way, the diffusion bonding step and the inflation step (distortion removal step) are combined into one operation, providing improved production economies.

For Ti-8Al-1Mo-1V blade sections 10,12, the pressure-temperature-time conditions for practicing the combined diffusion bonding and inflation step comprise a pressure (in cavities 15 and manifold chamber 25a) of about 300 psi-600 psi temperature of about 1750° F. and a time of about 120 minutes.

The present invention provides a method to economically fabricate durable, light weight hollow articles and structures for high performance applications. The applications include aircraft and land based turbine engines, other turbomachinery, critical aircraft structural members, and other structures having critical physical and mechanical property requirements.

The method of the present invention includes the following advantages and objects:
(a) Complex hollow parts can be fabricated without adversely affecting the physical or mechanical characteristics of the initial bulk material (e.g., the Ti-8Al-1Mo-1V alloy of blade sections 10,12).
(b) The geometry of the internal passages or cavities 15 is fully controlled as a result of the process sequence.
(c) Special material properties, such as superplasticity, are not required to practice this invention.
(d) The process is not limited by inherent preform size or design geometries.
(e) Full parent metal diffusion bonding is assured.
(f) Conventional inspection means can be used to inspect and verify the cavity geometries prior to the joining operations.

Although certain preferred features and embodiments of the invention have been described hereinabove and in the drawings, it is to be understood that modifications and changes may be made therein without departing from the spirit and scope of the invention as defined in the appended claims.

I claim:
1. A method of making a hollow article from first and second preformed sections, each preformed section having spaced apart bonding surfaces and a wall intermediate the bonding surfaces, comprising the steps of:
(a) assembling the first and second preformed sections in such a manner that the bonding surfaces of the preformed sections are opposing and the intermediate walls of the preformed sections define a cavity therebetween,
(b) subjecting the assembled preformed sections to pressure-temperature-time conditions where a first external pressure is so applied to the first preformed section with the cavity evacuated as to form a substantially fluid impermeable seal bond between the bonding surfaces,
(c) subjecting the preformed sections to pressure-temperature-time conditions where a second external pressure greater than the first external pressure is so applied to the first preformed section and an internal pressure of substantially the same magnitude as said second external pressure is so applied to the cavity as to diffusion bond the bonding surfaces, and (d) subjecting the preformed sections to pressure-temperature-time conditions where an internal pressure is so applied to the cavity with the intermediate wall of the first preformed section positioned relative to a rigid external shaping surface as to shape the intermediate wall to the shaping surface to remove any inward distortion of the intermediate wall resulting from step (b).

2. The method of claim 1 including substantially preventing distortion of the intermediate wall of the second preformed section in steps (b), (c) and (d).

3. The method of claim 2 wherein distortion of the intermediate wall of the second preformed section is prevented in step (b) by subjecting the cavity and the exterior of said intermediate wall of said second preformed to a relative vacuum.

4. The method of claim 2 wherein distortion of the intermediate wall of the second preformed section is prevented in step (c) by supporting it on a rigid surface.

5. The method of claim 2 wherein distortion of the intermediate wall of the second preformed section is prevented in step (d) by subjecting said intermediate wall to an external pressure substantially the same as said internal pressure.

6. The method of claim 1 wherein the first external pressure applied in step (b) is about 50 to about 100 psi.

7. The method of claim 1 wherein the second external pressure and the internal pressure applied in step (c) is about 300 psi to about 600 psi.

8. The method of claim 1 wherein the first and second preformed sections are configured as portions of an airfoil.

9. The method of claims 1 or 8 wherein the first and second preformed sections include cooperating bonding surfaces inboard of said spaced apart bonding surfaces and said inboard bonding surfaces are seal bonded in step (b) and diffusion bonded in step (c) to form a rib between said preformed sections dividing the cavity.

10. The method of claim 1 wherein the fluid impermeable seal bond formed in step (b) includes disconnected porosity.

11. A method of making a hollow article from first and second preformed sections, each preformed section having spaced apart bonding surfaces and a wall intermediate the bonding surfaces, comprising the steps of:

(a) assembling the first and second preformed sections in such a manner that the bonding surfaces of the preformed sections are opposing and the intermediate walls of the sections define a cavity therebetween, (b) subjecting the assembled preformed sections to pressure-temperature-time conditions where a first external pressure is so applied to the first preformed section with the cavity evacuated so as to form a substantially fluid impermeable seal bond between the bonding surfaces, and (c) subjecting the preformed sections to pressure-temperature-time conditions where an external pressure of greater magnitude than the first external pressure is applied to the second preformed section and an internal pressure of substantially the same magnitude as the second external pressure is applied to the cavity while the intermediate wall of the first preformed section is positioned relative to a rigid external shaping surface such that the intermediate wall of said first preformed section is shaped to said shaping surface to remove any inward distortion thereof resulting from step (b) and such that the bonding surfaces are diffusion bonded.

12. The method of claim 11 including substantially preventing distortion of the intermediate wall of said second preformed section in steps (b) and (c).

13. The method of claim 12 wherein distortion of the intermediate wall of the second preformed section is prevented in step (b) by subjecting the cavity and the exterior of said intermediate wall of said second preformed to a relative vacuum.

14. The method of claim 12 wherein distortion of the intermediate wall of the second preformed section is prevented in step (d) by subjecting said intermediate wall to an external pressure generally the same as said internal pressure.

15. The method of claim 11 wherein the first external pressure applied in step (b) is about 50 to about 100 psi.

16. The method of claim 11 wherein the second external pressure and the internal pressure applied in step (c) is about 300 to about 600 psi.

17. The method of claim 11 wherein the first and second preformed sections are configured as portions of an airfoil.

18. The method of claims 11 or 17 wherein the first and second preformed sections include cooperating bonding surfaces inboard of said spaced apart bonding surfaces and said inboard bonding surfaces are seal bonded in step (b) and are diffusion bonded together in step (c) to form a rib between said preformed sections dividing the cavity.

19. The method of claim 11 wherein the fluid impermeable seal bond formed in step (b) includes disconnected porosity.

* * * * *